UNITED STATES PATENT OFFICE.

ROBERT MASON LAWRENCE, OF NEW ORLEANS, LOUISIANA, ASSIGNOR TO HENRY MESTAYER, OF NEW ORLEANS, LOUISIANA.

FOOD PRODUCT.

1,035,609.  Specification of Letters Patent.  Patented Aug. 13, 1912.

No Drawing.  Application filed August 31, 1910.  Serial No. 579,956.

*To all whom it may concern:*

Be it known that I, ROBERT M. LAWRENCE, a citizen of the United States, and a resident of New Orleans, in the parish of Orleans and State of Louisiana, have invented a new and Improved Food Product, of which the following is a full, clear, and exact description.

This invention relates to certain improvements in food products for animals, and the object of the invention is to provide a food product of a palatable nature and containing high percentages of protein and carbo hydrates.

In forming my improved food products, I utilize a plant of the order *Typhaceæ* as a base and the main ingredient. In connection with this base I may employ a suitable quantity of grain or other food product commonly used for cattle, and I preferably also employ a quantity of molasses. The species of the base preferably employed, is either *Spartina cynosuroides* or *Typha augustifolia*, or the two may be employed together. They both grow in marshes, where they are inaccessible to cattle, and even if they were accessible, the cattle would not ordinarily eat them. They are not of such a nature that they can be harvested and dried for food as can ordinary hay.

In preparing my improved food product, I gather these plants, and grind, chop, macerate or otherwise finely subdivide the same and mix it with corn, rice-bran, alfalfa, cotton seed meal, brewers' grains, oat feeds, corn bran, or corn feeds, or with two or more of these ingredients, and I also intermix molasses obtained from either cane or beets, and of a grade commonly known as "black strap." The proportions of the ingredients will vary according to the demands of the trade, and some feeds will require more molasses than others. The base may vary from 25 per cent. to 90 per cent. in weight of the entire mass. The ingredients are thoroughly intermixed and may be preserved for a considerable time before being fed.

The food product is highly nutritious and is very palatable to horses, cattle, or other domestic animals.

Having thus described my invention, I claim as new and desire to secure by Letters Patent:

1. A food product for animals, comprising as a base, a finely-subdivided plant of the order of *Typhaceæ*.

2. A food product for animals, having as a base, the finely-subdivided leaves and stalks of a plant of the order of *Typhaceæ*.

3. A food product for animals, having as a base the finely-subdivided leaves and stalks of a plant of the order of *Typhaceæ* and including molasses.

4. A food product for animals, which consists of grain and low grade molasses mixed with the finely sub-divided leaves and stalks of plants of the order of *Typhaceæ*.

In testimony whereof I have signed my name to this specification in the presence of two subscribing witnesses.

ROBERT MASON LAWRENCE.

Witnesses:
H. MESTAYER,
PHILIP H. MENTZ.

---

Copies of this patent may be obtained for five cents each, by addressing the "Commissioner of Patents, Washington, D. C."